(12) United States Patent
Noh et al.

(10) Patent No.: US 8,892,150 B2
(45) Date of Patent: Nov. 18, 2014

(54) COMMUNICATION METHOD OF NEIGHBORING TERMINAL AND TARGET TERMINAL

(75) Inventors: Won Jong Noh, Yongin-si (KR); Hyun Ho Choi, Suwon-si (KR); Won Jae Shin, Yongin-si (KR); Sang Uk Park, Seoul (KR); Dong Jo Park, Daejeon (KR); Chang Yong Shin, Seoul (KR); Joon Tae Kim, Daejeon (KR); Seung Won Choi, Busan (KR); Jung Min Moon, Seoul (KR); Dong Ho Cho, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 419 days.

(21) Appl. No.: 13/326,595

(22) Filed: Dec. 15, 2011

(65) Prior Publication Data

US 2012/0157139 A1    Jun. 21, 2012

(30) Foreign Application Priority Data

Dec. 21, 2010    (KR) .................. 10-2010-0131206

(51) Int. Cl.
| | | |
|---|---|---|
| *H04B 7/00* | (2006.01) | |
| *H04W 72/04* | (2009.01) | |
| *H04W 72/12* | (2009.01) | |
| *H04W 8/18* | (2009.01) | |
| *H04B 7/02* | (2006.01) | |
| *H04W 52/40* | (2009.01) | |

(52) U.S. Cl.
CPC ........ *H04W 72/0406* (2013.01); *H04W 72/121* (2013.01); *H04W 8/186* (2013.01); *H04B 7/026* (2013.01); *H04W 52/40* (2013.01)
USPC ......... 455/519; 455/517; 455/435.1; 455/509

(58) Field of Classification Search
CPC ............................. H04W 60/00; H04W 84/00
USPC .............. 455/507, 509, 517, 434, 452.1, 450, 455/426.1, 435.1, 515, 67.11, 520, 519; 370/328, 329, 338, 337
See application file for complete search history.

(56) References Cited

U.S. PATENT DOCUMENTS

| | | | |
|---|---|---|---|
| 7,061,891 | B1 | 6/2006 | Kilfoyle et al. |
| 2007/0135151 | A1* | 6/2007 | Dendy .......................... 455/517 |
| 2012/0230264 | A1* | 9/2012 | Zhang et al. .................. 370/329 |
| 2013/0039326 | A1* | 2/2013 | Kim et al. ..................... 370/329 |
| 2014/0071896 | A1* | 3/2014 | Lin et al. ....................... 370/328 |

FOREIGN PATENT DOCUMENTS

| | | |
|---|---|---|
| KR | 10-2007-0027468 | 3/2007 |
| KR | 10-2008-0083460 | 9/2008 |
| KR | 10-2008-0087211 | 10/2008 |
| KR | 10-2009-0039573 | 4/2009 |
| KR | 10-2010-0035369 | 4/2010 |
| KR | 10-2010-0074803 | 7/2010 |

* cited by examiner

*Primary Examiner* — John J Lee
(74) *Attorney, Agent, or Firm* — NSIP Law

(57) ABSTRACT

Provided is a communication method of a neighboring terminal and a target terminal in which a cooperative terminal that has a better SINR or a better channel condition provides help to a target terminal through cooperation between terminals based on a random access mode or a scheduling mode, so that an SINR of the target terminal is improved without help from a base station.

26 Claims, 21 Drawing Sheets

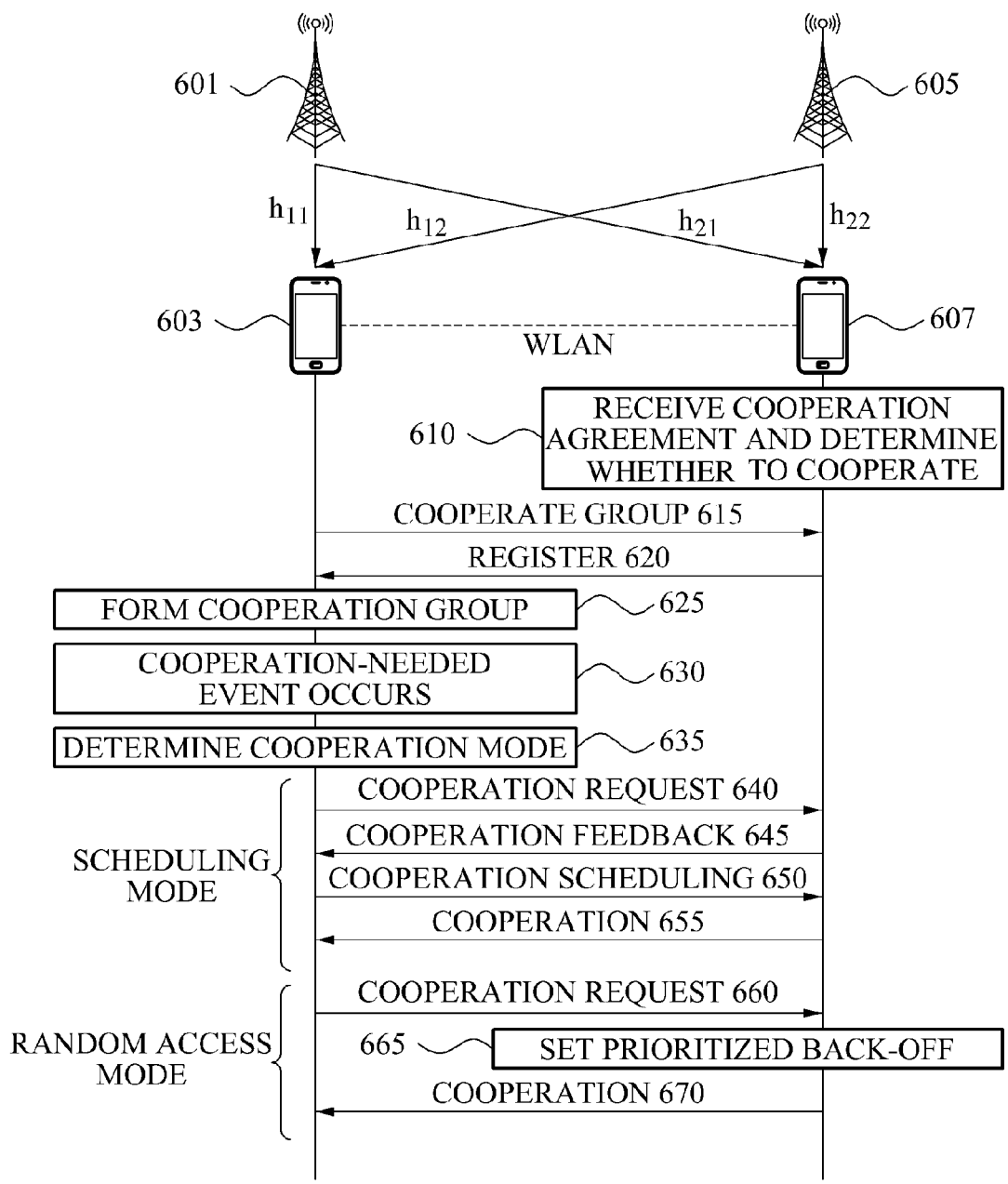

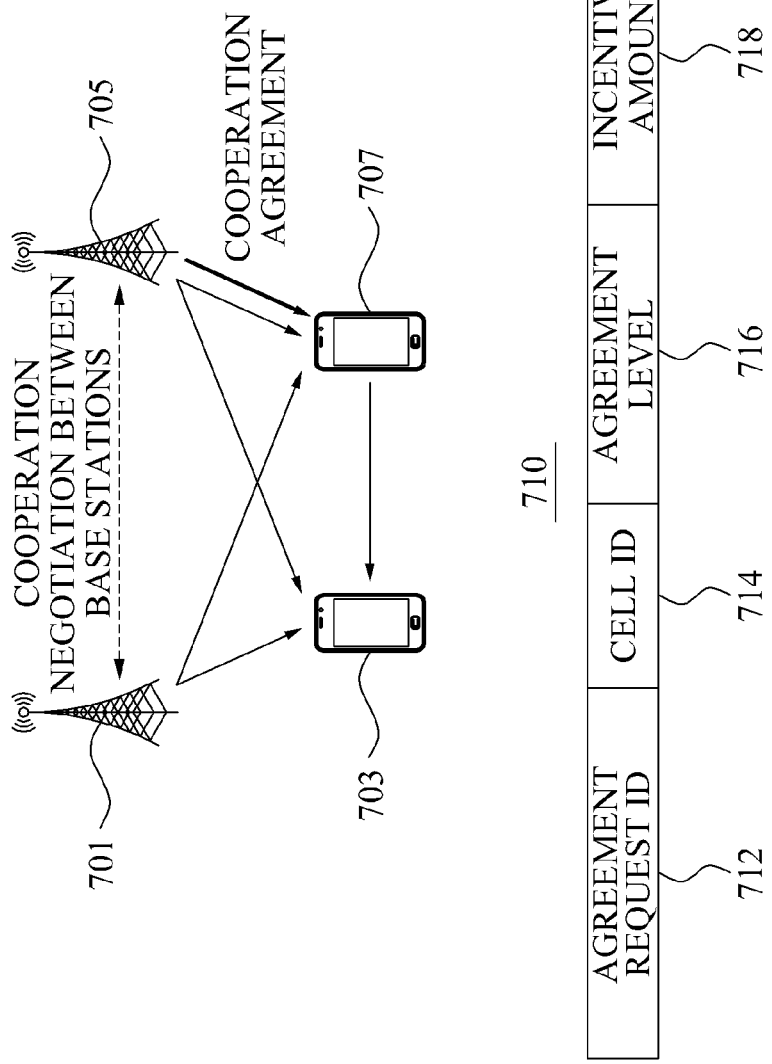

1300

COMMUNICATION METHOD OF NEIGHBORING TERMINAL AND TARGET TERMINAL

CROSS-REFERENCE TO RELATED APPLICATION

This application claims the benefit under 35 U.S.C. §119 (a) of Korean Patent Application No. 10-2010-0131206, filed on Dec. 21, 2010, in the Korean Intellectual Property Office, the entire disclosure of which is incorporated herein by reference for all purposes.

BACKGROUND

1. Field

The following description relates to cooperation of a neighboring terminal and a target terminal.

2. Description of Related Art

Due to the increase of portable terminals such as smart phones and notebooks, a local area network has been established in places to provide more communication environments to the terminals. Accordingly, users of the terminals can communicate with each other via a heterogeneous network instead of a cellular network.

However, if a terminal is positioned at the edge of a cell, a signal from a base station in a neighboring cell may interfere with the terminal. Accordingly, the terminal on the edge of the cell may have a poor signal to interference plus noise ratio (SINR) creating lower processing capacity.

SUMMARY

In one general aspect, there is provided a communication method of a neighboring terminal, the method including determining whether to cooperate with at least one target terminal, receiving a request for joining a cooperation group from the at least one target terminal, requesting registration from the at least one target terminal to join the cooperation group, and performing cooperative communication with the at least one target terminal based on registration information that is obtained when the neighboring terminal joins the cooperation group.

The determining whether to cooperate may comprise receiving a message based on an agreement between base stations for cooperation between terminals, which is broadcasted from a base station of the at least one neighboring terminal, and determining whether to cooperate with the at least one target terminal based on the message based on the agreement.

The message based on the agreement may comprise at least one of an agreement request identification (ID) that is used to identify when the agreement is broadcasted by the base station of the neighboring terminal, an ID of a cell in which the neighboring terminal is positioned, an agreement level that represents an extent of an incentive given based on a cooperation level requested allocated to the neighboring terminal, and an incentive amount that represents a compensation method provided to the neighboring terminal based on the cooperation level and a compensation amount based on the compensation method.

The compensation method provided to the neighboring terminal may comprise at least one of a method of reducing interference with the neighboring terminal via adjustment of a beam vector, a method of reducing interference with the neighboring terminal via dynamic spectrum management (DSM), and a method of increasing transmission power with respect to the neighboring terminal.

The request for joining the cooperation group may comprise at least one of a request ID to distinguish types of cooperation requested by the at least one target terminal over time, an ID of a cell in which the at least one target terminal is positioned, an ID of the at least one target terminal, and a cooperation level allocated to the neighboring terminal to provide cooperation to the at least one target terminal.

The requesting the registration from the at least one target terminal may further comprise transmitting a registration request message for cooperation provided by the neighboring terminal to at least one of the at least one target terminal, a base station of the at least one target terminal, a base station of the neighboring terminal, and an external server, and wherein the registration request message may comprise at least one of a registration ID to distinguish which cooperation the registration is for among types of cooperation requested by the at least one target terminal over time, an ID of the at least one target terminal, a cooperation level allocated to the neighboring terminal, a forwarding mode that represents a type of information provided to the at least one target terminal through the cooperation, a relay mode that represents a mode in which the information is provided to the at least one target terminal, and a wireless mode that represents a wireless communication method between the at least one target terminal and the neighboring terminal.

The cooperation level may be classified based on at least one of a battery capacity of the neighboring terminal and a processor capacity of the neighboring terminal.

The cooperation level may comprise at least one of a level 0 to provide unconditional cooperation to the at least one target terminal within a predetermined range of cooperation, a level 1 to provide cooperation to the at least one target terminal within a providable range of cooperation provided by the neighboring terminal, and a level 2 to provide cooperation preferentially to the at least one target terminal.

The performing the cooperative communication with the at least one target terminal based on the registration information may comprise receiving a request for the cooperation from the at least one target terminal, and performing cooperative communication with the at least one target terminal based on the registration information according to the request for the cooperation.

The request for cooperation may comprise at least one of a registration ID to distinguish types of cooperation requested by the at least one target terminal over time, a cooperation mode that represents a method of providing cooperation to the at least one target terminal based on the request for the cooperation, a cooperation level allocated to the neighboring terminal to provide cooperation to the at least one target terminal, a forwarding mode that represents a type of information provided to the at least one target terminal through the cooperation, a relay mode that represents a mode in which the information is provided to the at least one target terminal, a wireless mode that represents a wireless communication method between the at least one target terminal and the neighboring terminal, and a signal to interference plus noise ratio (SINR) gap between an SINR of the at least one target terminal and a preset target SINR.

The cooperation mode may be one of a scheduling mode in which the at least one target terminal determines an optimal cooperative terminal based on feedback information that is received from the neighboring terminal, and a random access mode in which the neighboring terminal randomly provides cooperation to the at least one target terminal.

The performing the cooperative communication with the at least one target terminal may comprise calculating a back-off time to provide the cooperation based on transmission power of the neighboring terminal, in response to a request for cooperation received from the at least one target terminal being based on a random access mode.

The performing the cooperative communication with the at least one target terminal may comprise transmitting a message including feedback information to the at least one target terminal, and receiving a message including scheduling information about an optimal cooperative terminal that is determined by the at least one target terminal based on the message including the feedback information, in response to a request for cooperation received from the at least one target terminal being based on a scheduling mode.

The message including the feedback information may comprise at least one of a registration ID to distinguish types of cooperation requested by the at least one target terminal over time, a cooperation level allocated to the neighboring terminal to provide cooperation to the at least one target terminal, a forwarding mode that represents a type of information provided to the at least one target terminal through the cooperation, a relay mode that represents a mode in which the information is provided to the at least one target terminal, and a wireless mode that represents a wireless communication method between the at least one target terminal and the neighboring terminal, and wherein the message including the scheduling information may further comprise an ID of the optimal cooperative terminal in addition to the message including the feedback information.

In another aspect, there is provided a communication method of a target terminal, the method including requesting a neighboring terminal to join a cooperation group, receiving a registration request from the at least one neighboring terminal, in response to the request to join, allowing the at least one neighboring terminal to join the cooperation group based on the registration request, and performing cooperative communication with the at least one cooperative terminal included in the cooperation group, in response to a predetermined event based on agreement between base stations occurring.

The requesting the neighboring terminal to join the cooperation group may comprise transmitting a message, and the message may comprise at least one of a request ID to distinguish types of cooperation requested by the target terminal over time, an identification (ID) of a cell in which the target terminal is positioned, an ID of the target terminal, and a cooperation level allocated to the at least one neighboring terminal to provide cooperation to the target terminal.

The receiving the registration request from the at least one neighboring terminal may comprise receiving a message comprising at least one of a registration ID to distinguish which cooperation the registration is for among types of cooperation requested by the at least one target terminal over time, an ID of the target terminal, a cooperation level allocated to the at least one neighboring terminal, a forwarding mode that represents a type of information provided to the target terminal through the cooperation, a relay mode that represents a mode in which the information is provided to the target terminal, and a wireless mode that represents a wireless communication method between the target terminal and the at least one neighboring terminal.

The performing the cooperative communication may comprise determining a cooperation mode between the target terminal and the at least one cooperative terminal, and transmitting a request for cooperation to the at least one cooperative terminal included in the cooperation group based on the cooperation mode, and wherein the request for cooperation may comprise at least one of a registration ID to distinguish types of cooperation requested by the target terminal over time, a cooperation mode that represents a method of providing cooperation to the target terminal based on the request for cooperation, a cooperation level allocated to the at least one cooperative terminal to provide cooperation to the target terminal, a forwarding mode that represents a type of information provided to the target terminal through the cooperation, a relay mode that represents a mode in which the information is provided to the target terminal, a wireless mode that represents a wireless communication method between the target terminal and the at least one cooperative terminal, and a signal to interference plus noise ratio (SINR) gap between an SINR of the target terminal and a preset target SINR.

The cooperation mode may be one of a scheduling mode in which the target terminal determines an optimal cooperative terminal based on feedback information that is received from the at least one cooperative terminal, or a random access mode in which the at least one cooperative terminal randomly provides cooperation to the target terminal.

The communication method may further comprise determining an optimal cooperative terminal based on feedback information that is received from the at least one cooperative terminal included in the cooperation group when the cooperation mode is the scheduling mode, and transmitting information based on the scheduling mode to the optimal cooperative terminal, wherein the transmitting the information based on the scheduling mode comprises transmitting a message including scheduling information, the message comprising at least one of a registration ID to distinguish types of cooperation requested by the target terminal over time, a cooperation level allocated to the at least one cooperative terminal to provide cooperation to the target terminal, a forwarding mode that represents a type of information provided to the target terminal through the cooperation, a relay mode that represents a mode in which the information is provided to the target terminal, and a wireless mode that represents a wireless communication method between the target terminal and the at least one cooperative terminal.

In another aspect, there is provided a computer-readable storage medium comprising program instructions to cause a processor to implement a method including determining whether to cooperate with at least one target terminal, receiving a request for joining a cooperation group from the at least one target terminal, requesting registration from the at least one target terminal to join the cooperation group, and performing cooperative communication with the at least one target terminal based on registration information that is obtained when the neighboring terminal joins the cooperation group.

In another aspect, there is provided a target terminal for receiving cooperative communication from a cooperation group, the target terminal including a communication unit configured to communicate with neighboring terminals, and a controller configured to form the cooperation group based on registration requests received from the neighboring terminals, and in response to a predetermined event occurring that triggers cooperative communication, configured to determine a cooperation mode from among a plurality of cooperation modes, wherein, in response to the predetermined event occurring, the transmitter transmits a request for cooperative communication indicating the determined cooperation mode to at least one cooperative terminal included in the cooperation group.

The plurality of cooperation modes may comprise a scheduling mode in which the target terminal determines an optimal cooperative terminal from among the cooperative terminals included in the cooperation group, based on feedback information that is received from the cooperative terminals included in the cooperation group, and a random access mode in which the cooperative terminals included in the cooperation group randomly perform cooperative communication with the target terminal.

The target terminal may further comprise a storage unit configured to store a location of the target terminal and a location of cooperative terminals included in the cooperation group, and conditions for cooperative communication of the target terminal and the cooperative terminals included in the cooperation group.

The receiver may be further configured to receive cooperative communication from at least one cooperative terminal, the cooperative communication comprising at least one of a signal destined for the target terminal and a signal that acts as interference on the target terminal.

The event that triggers the cooperative communication may be the quality of a received signal dropping below a predetermined threshold.

Other features and aspects may be apparent from the following detailed description, the drawings, and the claims.

BRIEF DESCRIPTION OF THE DRAWINGS

FIG. 6 is a diagram illustrating an example of a process of performing cooperative communication between a target terminal and a cooperative terminal.

FIG. 7 is a diagram illustrating an example of a message received by a neighboring terminal, based on agreement between base stations for cooperation between terminals.

Figure 1:
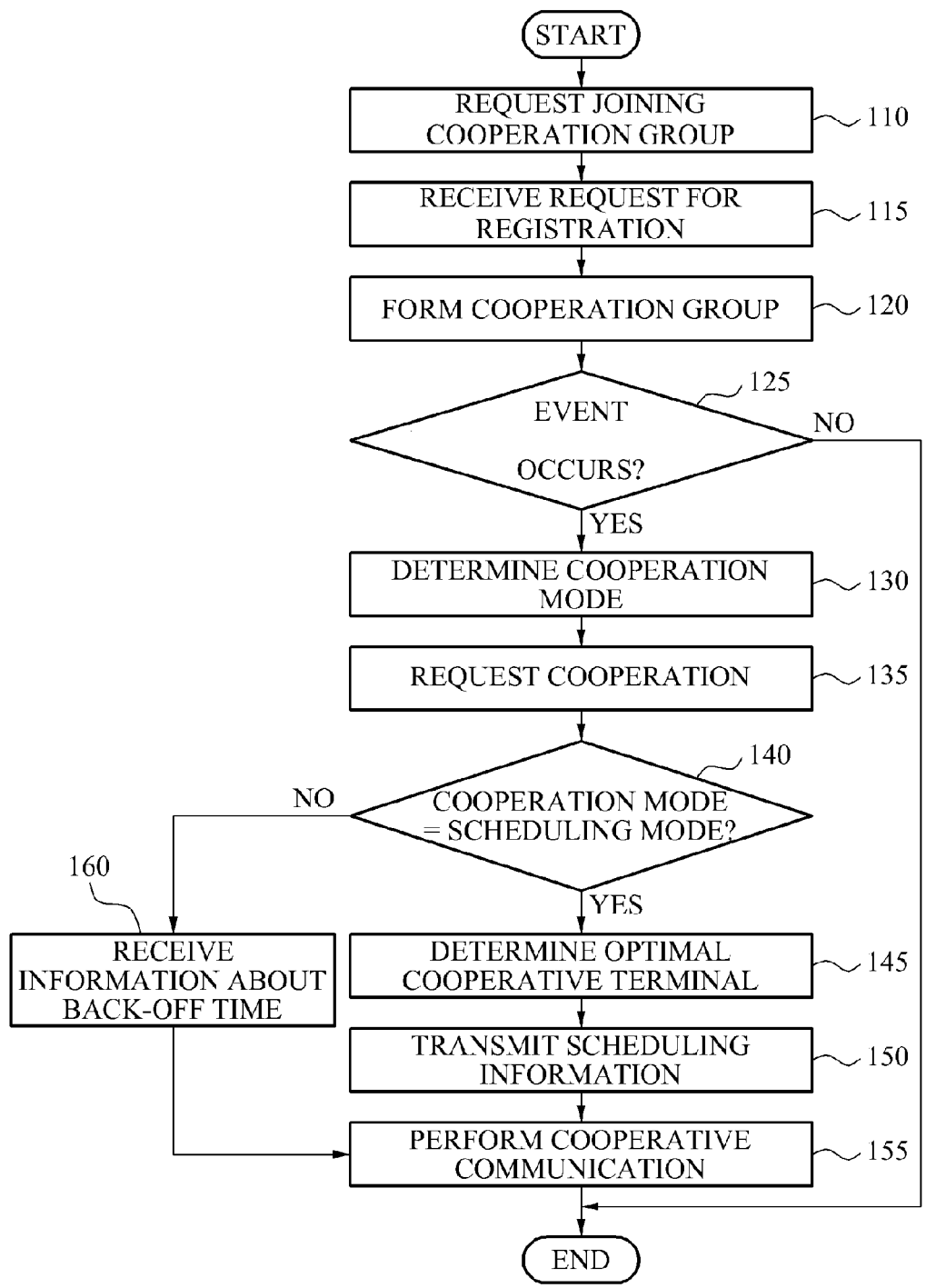
FIG. 1 is a flowchart illustrating an example of a communication method of a target terminal.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Hereinafter, a "target terminal" refers to a terminal that receives help from at least one neighboring terminal through cooperative communication between terminals. A "neighboring terminal" refers to at least one terminal that provides help to the target terminal through cooperative communication between terminals. A "cooperative terminal" refers to a terminal that joins a cooperation group and that registers cooperation based on a request of a target terminal for cooperation. In various examples, the neighboring terminal and the cooperative terminal are regarded as the same terminal throughout the specification.

FIG. 1 illustrates an example of a communication method of a target terminal.

Referring to FIG. 1, the target terminal requests that at least one neighboring terminal join a cooperation group that includes at least one cooperative terminal, in 110. In this example, at least one cooperative terminal may already be included in the cooperation group as at least one neighboring terminal joins the cooperation group. As another example, there may be no cooperative terminal included in the cooperation group as at least one neighboring terminal joins the cooperation group as a first cooperative terminal.

For example, the target terminal may transmit a message requesting the at least one neighboring terminal to join the cooperation group.

The message may include, for example, at least one of a request identification (ID), a cell ID, a target terminal ID, and a cooperation level. An example of a message requesting a terminal to join the cooperation group is described with reference to FIG. 8.

The target terminal receives a registration request from the at least one neighboring terminal in response to the request for joining the cooperation group, in 115. For example, the target terminal may receive a message that includes a registration request from the at least one neighboring terminal.

The registration request message may include, for example, at least one of a registration ID, a terminal ID, a cooperation level, a forwarding mode, a relay mode, a wireless mode, and the like. An example of the message for requesting registration is described with reference to FIG. 9.

The target terminal allows the at least one neighboring terminal to join the cooperation group based on the request for registration that is received from the at least one neighboring terminal, in 120. Accordingly, the at least one neighboring terminal becomes at least one cooperative terminal joining the cooperation group. In this example, the group may already include other cooperating terminals, or the group may be formed of the target terminal and the at least one neighboring terminal.

The target terminal determines whether a predetermined event occurs, in 125. The predetermined event may be based on agreement between a base station of the target terminal and a base station of the at least one neighboring terminal. If the predetermined event does not occur in 125, the method may end or the method may be repeated.

In response to the event occurring, the target terminal determines a cooperation mode between the at least one cooperative terminal included in the cooperation group and the target terminal, in 130.

The target terminal transmits a message requesting cooperation to the at least one cooperative terminal, included in the cooperation group, and requests the cooperation based on the cooperation mode, in 135. For example, the message requesting cooperation may include at least one of a request ID, a cooperation mode, a cooperation level, a forwarding mode, a relay mode, and a signal to interference plus noise ratio (SINR) gap. An example of the message requesting cooperation is described with reference to FIG. 10.

As an example, the cooperation mode may be a scheduling mode in which the target terminal determines an optimal cooperative terminal based on feedback information that is received from the at least one cooperative terminal, and a random access mode in which the at least one cooperative terminal randomly provides cooperation to the target terminal.

In response to the cooperation mode being determined as the scheduling mode, in 140, the target terminal determines an optimal cooperative terminal based on feedback information that is included in a message received from the at least one cooperative terminal that is included in the cooperation group, in 145. The target terminal transmits information based on the scheduling mode to the optimal cooperative terminal, in 150.

The target terminal may determine, as the optimal terminal, a cooperative terminal that provides transmission power used by the target terminal, based on the feedback information. For example, in 150, the transmission of the information based on the scheduling mode may be performed using a message that includes scheduling information.

The message including the scheduling information may include, for example, at least one of a request ID, a terminal ID, a cooperation level, a forwarding mode, a relay mode, and a wireless mode. Examples of a message including feedback information and a message including scheduling information are described with reference to FIG. 11.

After the message including the scheduling information is transmitted, the target terminal performs cooperative communication with the optimal cooperative terminal, in 155. If the cooperation mode is not the scheduling mode in 140, but it is instead the random access mode, the target terminal receives information about a back-off time from the cooperative terminal, in 160, and performs cooperative communication with the cooperative terminal based on the back-off time, in 155.

Figure 2:
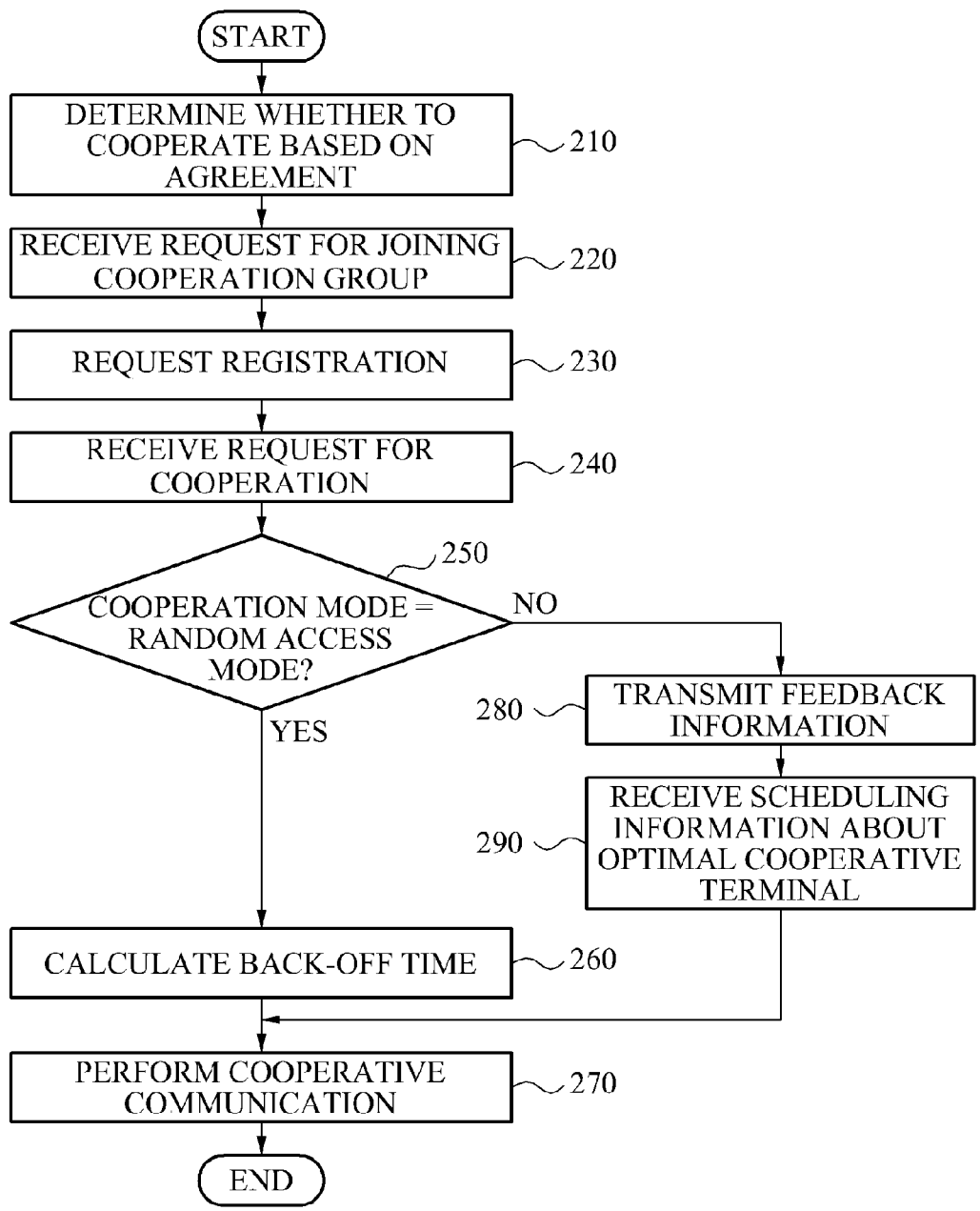
FIG. 2 is a flowchart illustrating an example of a communication method of a neighboring terminal.

FIG. 2 illustrates an example of a communication method of a neighboring terminal.

Referring to FIG. 2, a neighboring terminal determines whether to cooperate with at least one target terminal based on agreement between a base station of the target terminal and a base station of the neighboring terminal, in 210.

For example, the neighboring terminal may receive a message based on the agreement between the base stations for cooperation between the terminals. The message may be broadcasted from the base station of the neighboring terminal. The neighboring terminal may determine whether to cooperate with the at least one target terminal based on the message that is based on the agreement. The message based on the agreement may include, for example, at least one of an agreement request ID, a cell ID, an agreement level, and an incentive amount. An example of the message based on the agreement is described with reference to FIG. 7.

The neighboring terminal receives, from the at least one target terminal, a request for joining a cooperation group including at least one cooperative terminal, in 220. In 220, the neighboring terminal may receive a message of a request for joining the cooperation group including the at least one cooperative terminal, from the base station of the at least one target terminal and the base station of the neighboring terminal. An example of the message of the request for joining the cooperation group including the at least one cooperative terminal, received by the neighboring terminal, is described with reference to FIG. 8.

The neighboring terminal requests registration from the at least one target terminal in order to join the cooperation group, in 230. The neighboring terminal may transmit the registration request message with respect to cooperation provided by the neighboring terminal to at least one of the base station of the at least one target terminal, the base station of the neighboring terminal, and an external server. An example of a registration request message is described with reference to FIG. 9.

In response to the neighboring terminal joining the cooperation group, the neighboring terminal may perform cooperative communication with the at least one target terminal based on information that is registered in the target terminal through the request for registration in 230. As the neighboring terminal joins the cooperation group, the neighboring terminal becomes a cooperative terminal.

In 240, the cooperative terminal receives a message requesting cooperation from the at least one target terminal and performs cooperative communication with the at least one target terminal based on the registered information that is based on the message requesting cooperation. The message requesting cooperation may include, for example, at least one of a registration ID, a cooperation mode, a cooperation level, a forwarding mode, a relay mode, a wireless mode, and an SINR gap. An example of a message requesting cooperation is described with reference to FIG. 10.

The cooperation mode of the message requesting cooperation may be a scheduling mode in which the at least one target terminal determines an optimal cooperative terminal based on feedback information that is received from the cooperative terminal, and a random access mode in which the cooperative terminal randomly provides cooperation to the at least one target terminal.

The cooperative terminal determines whether the cooperation mode is a random access mode, that is, whether the request for cooperation transmitted from the at least one target terminal is a request for cooperation based on a random access mode in which the cooperative terminal randomly provides cooperation to the target terminal, in 250.

If the cooperation mode is a random access mode, the cooperative terminal calculates a back-off time to provide cooperation to the at least one target terminal based on transmission power of the cooperative terminal, in 260. In 270, the cooperative terminal performs cooperative communication with the at least one target terminal based on the back-off time.

If the cooperation mode is not a random access mode but is instead a request for cooperation based on a scheduling mode, in 250, the cooperative terminal transmits a message including feedback information to the at least one target terminal, in 280.

The message including the feedback information may include, for example, at least one of a registration ID, a cooperation level, a forwarding mode, a relay mode, and a wireless mode. In 290, the cooperative terminal receives a message including scheduling information about an optimal cooperative terminal that is determined by the at least one target terminal based on the message including the feedback information.

Examples of a message including feedback information and a message including scheduling information are described with reference to FIG. 11.

Hereinafter, various types of cooperation topology in which cooperative communication is performed with the neighboring terminals, cooperation transmission methods, and locations in which cooperation information is stored, are described.

In the following description, terminals positioned on the left side in the drawings are referred to as target terminals that desire to receive help through cooperation between terminals, and terminals positioned on the right side in the drawings are referred to as cooperative terminals that may provide help through cooperation between terminals.

In various example, $h_{11}$ denotes a channel between a target terminal and a base station of the target terminal, $h_{22}$ denotes a channel between a cooperative terminal and a base station of the cooperative terminal, $h_{21}$ denotes a channel between the base station of the target terminal and the cooperative terminal, and $h_{12}$ denotes a channel between the target terminal and the base station of the cooperative terminal.

FIGS. 3A to 3D illustrate examples of cooperative communication that is performed between terminals.

Referring to FIGS. 3A to 3D, cooperative configurations in which cooperative communication is performed between terminals enables cooperation in various environments, such as in a single cell, in a multi-cell, in a hierarchical cell, and in a homogenous cell. The terminals included in various types of cells may communicate with each other via a heterogeneous network, for example, a Wireless Local Area Network (WLAN), a Bluetooth, a Long Term Evolution (LTE), and the like, instead of a cellular network.

Figure 3A:
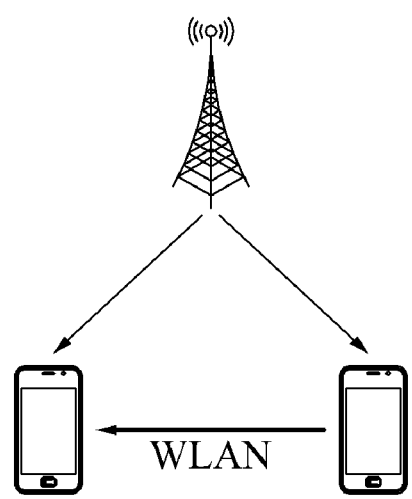
FIGS. 3A to 3D are diagrams illustrating examples of cooperative communication that is performed between terminals.
Figure 3B:
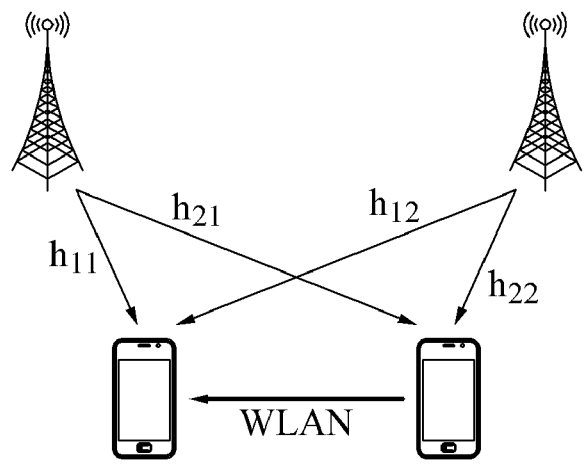

FIG. 3A illustrates an example of a cooperative configuration for different terminals provided with services from a base station of a single cell, and FIG. 3B illustrates an example of a cooperative configuration for terminals provided with services respectively from base stations of multi-cells, that is, a plurality of different cells.

Figure 3C:
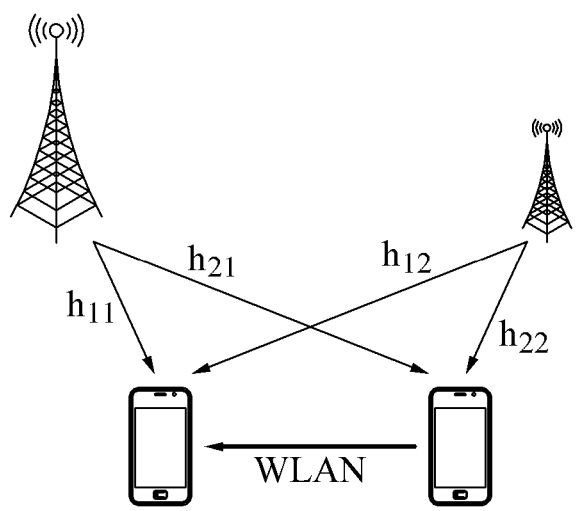

FIG. 3C illustrates an example of a cooperative configuration for terminals provided with services from base stations of different cells in a hierarchical cell that hierarchically includes micro cells, such as femto cells and pico cells, within a macro cell.

Figure 3D:
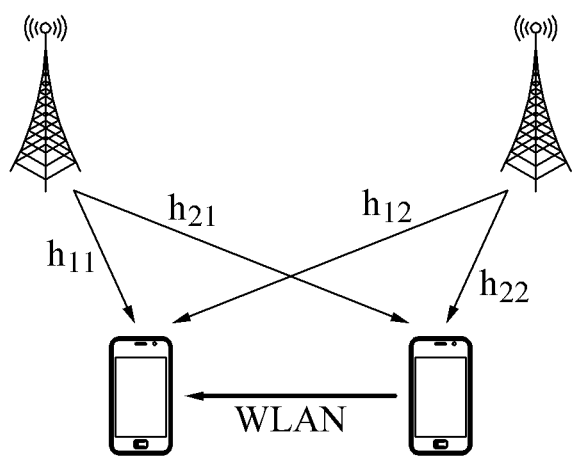

FIG. 3D illustrates an example of a cooperative configuration for terminals provided with services respectively from base stations in homogeneous cells, for example, homogeneous cells of pico cells or homogeneous cells of macro cells.

The cooperative communication may be performed between terminals respectively positioned in different types of cells.

FIGS. 4A to 4D illustrate examples of cooperation transmission methods between terminals. The various cooperation transmission methods of FIGS. 4A to 4D may enable terminals to cooperate with each other.

Figure 4A:
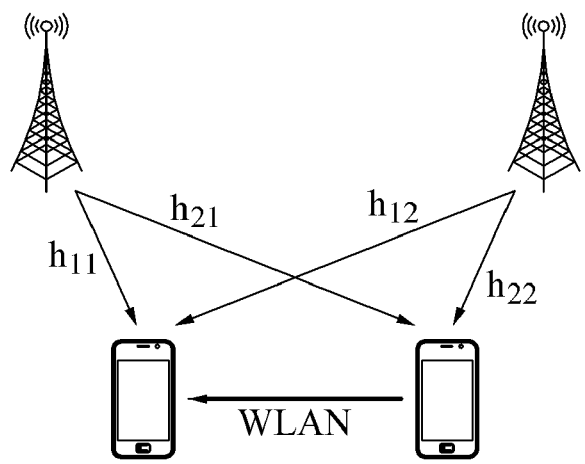
FIGS. 4A to 4D are diagrams illustrating examples of cooperation transmission methods between terminals.

FIG. 4A illustrates an example of a one-way cooperation in which only one side terminal, that is, a cooperative terminal, provides help through cooperative communication. In this example, the other side terminal, that is, a target terminal, receives the help. For example, the help provided to the target terminal through the cooperative communication may be a signal element of the target terminal which is received by the cooperative terminal or a signal element of the cooperative terminal which acts as an interference signal to the target terminal.

Figure 4B:
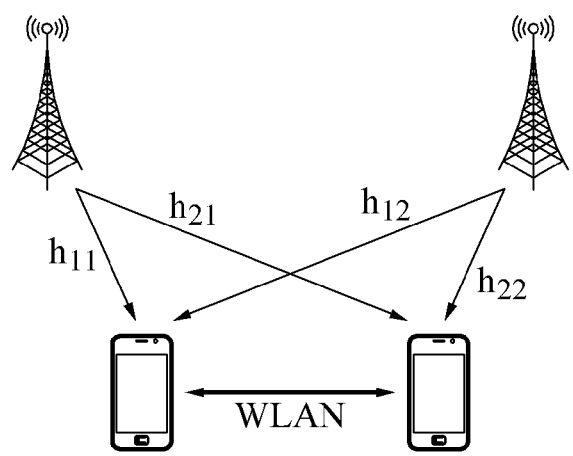

FIG. 4B illustrates an example of a two-way cooperation in which bilateral terminals provide help to each other through cooperation. In this example, a target terminal may transmit a signal element of a cooperative terminal which is received through a channel $h_{12}$ to the cooperative terminal through WLAN communication between the terminals. The cooperative terminal may transmit a signal element of the target terminal which is received through a channel $h_{21}$ to the target terminal through WLAN communication between the terminals.

In addition, the target terminal and the cooperative terminal may transmit their own signals that are received from base stations through channels $h_{11}$ and $h_{22}$ to the counterpart terminals.

Figure 4C:
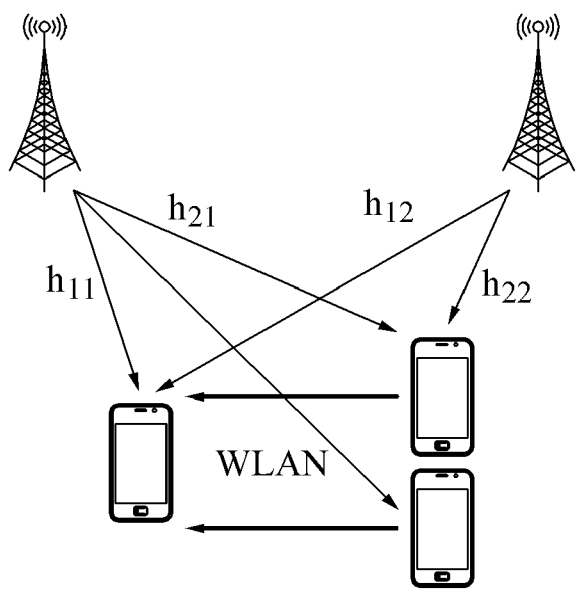

FIG. 4C illustrates an example of group-transmission cooperation in which a plurality of cooperative terminals included in a cooperation group transmit a signal element of the target terminal which is received from the base station of the target terminal through the channel $h_{21}$ to the target terminal through WLAN communication between the terminals. In the group-transmission cooperation, the plurality of cooperative terminals that are included in the cooperation group may be favorable in view of time delay and transmission power used to transmit a signal for cooperation in comparison to an example with one cooperative terminal.

Figure 4D:
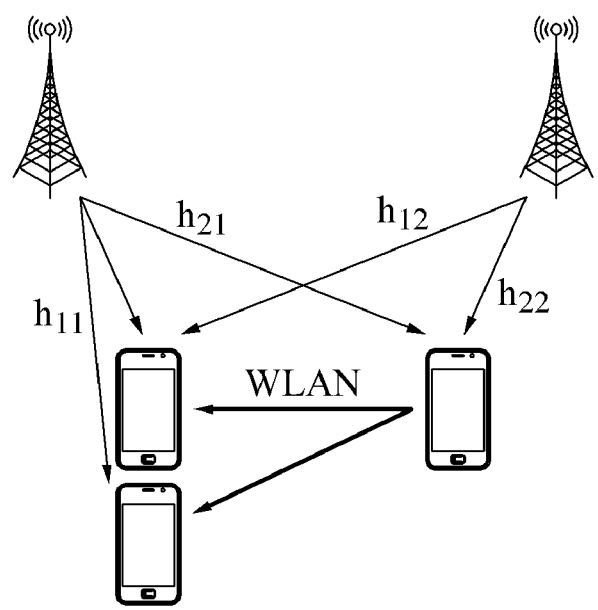

FIG. 4D illustrates an example of a group-reception cooperation in which a cooperative terminal transmits a signal element of a target terminal which is received from a base station of the target terminal through the channel $h_{21}$ to a target group including a plurality of target terminals. In the group-reception cooperation, a signal may be transmitted using more transmission power to target terminals that have a weak SINR from among the target terminals in the target group. As another example, the signal may be transmitted using a lower transmission power when compared to the other target terminals.

The cooperative communication between cooperative terminals and target terminals may be performed through various radio transmission schemes such as Bluetooth, LTE, WLAN, and the like.

Figure 5A:
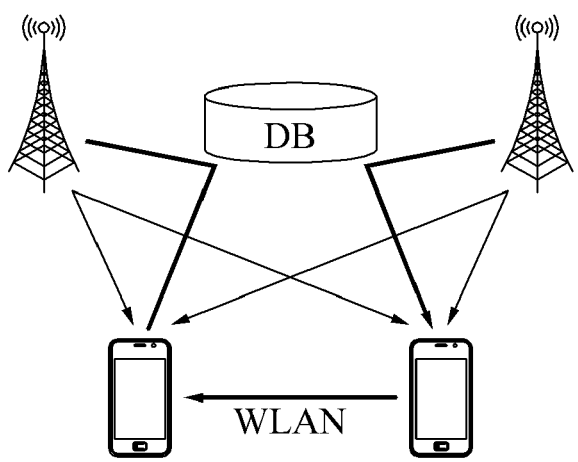
FIGS. 5A to 5C are diagrams illustrating examples of storage locations of information for cooperative communication between terminals.
Figure 5B:
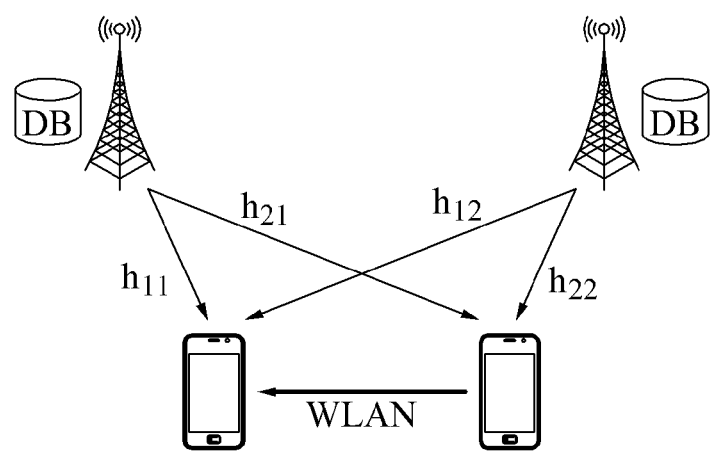
Figure 5C:
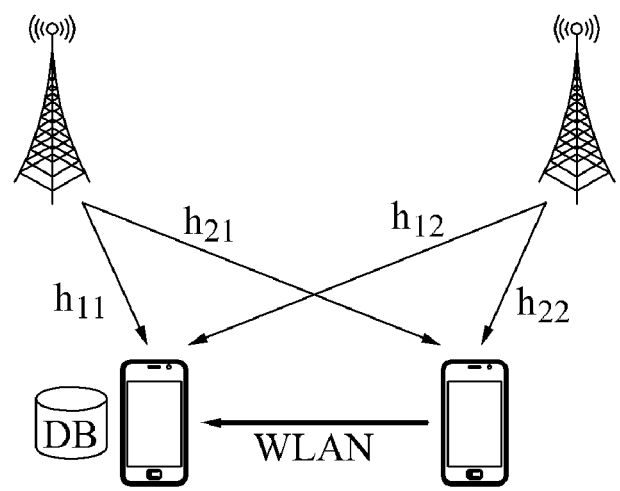

FIGS. 5A to 5C illustrate examples of storage locations of information for cooperative communication between terminals.

Referring to FIGS. 5A to 5C, the information for cooperative communication between terminals may include, for example, information about which target terminal is to be used to help from among a plurality of terminals constituting a network, the position of the target terminal, which cooperative terminal is to provide help, conditions for respective target terminals and respective cooperative terminals for cooperative communication between terminals, and the like.

The information for cooperation between terminals may be stored in an external server and may be accessed by each base station and terminals, as shown in FIG. 5A. As another example, the information may be stored in at least one of a base station of a cooperative terminal or base stations of target terminals, as shown in FIG. 5B. Further, the information for cooperation between terminals may be stored in a terminal requesting cooperation, that is, a target terminal, as shown in FIG. 5C.

FIG. 6 illustrates an example of a process of performing cooperative communication between a target terminal and a cooperative terminal.

Referring to FIG. 6, a network in which the cooperative communication is performed includes a base station 601 of a target terminal 603, the target terminal 603, a base station 605 of a neighboring terminal 607 that is a cooperative terminal, and the neighboring terminal 607.

For example, the target terminal 603 may be a single target terminal or a plurality of target terminals that are included in a target group. Further, the cooperative terminal 607 may be a single cooperative terminal or a plurality of cooperative terminals that are included in a cooperation group.

The neighboring terminal 607 receives an agreement between base stations, for example, the base station 601 of the target terminal 603 and the base station 605 of the neighboring terminal 607, for cooperation between terminals and determines whether to cooperate with the target terminal 603 based on the received agreement, in 610.

The target terminal 603 requests the neighboring terminal 607 to join the cooperation group that includes the at least one cooperative terminal, in 615. The neighboring terminal 607 requests registration from the target terminal 603 in order to join the cooperation group, in 620.

The target terminal 603 allows the neighboring terminal 607 requesting the registration to join the cooperation group in order to form the cooperation group, in 625. Accordingly, the neighboring terminal 607 becomes the cooperative terminal 607.

Then, if a predetermined event occurs that triggers cooperation between terminals, based on the agreement between the base stations, in 630, the target terminal 603 performs cooperative communication with the cooperative terminal 607 that is included in the cooperation group.

Before the cooperative communication, the target terminal 603 may determine a cooperation mode between the target terminal 603 and the cooperative terminal 607, in 635. For example, the cooperation mode may be a scheduling mode in which the target terminal 603 determines an optimal cooperative terminal based on feedback information that is received from the cooperative terminal 607, and a random access mode in which the cooperative terminal 607 randomly provides cooperation to the target terminal 603.

Operations 640 to 655 illustrate a process in which the cooperation mode is a scheduling mode, and operations 660 to 670 illustrate a process in which the cooperation mode is a random access mode.

In response to the cooperation mode being the scheduling mode, the target terminal 603 transmits a message requesting cooperation to the cooperative terminal, in 640, and receives feedback information from the cooperative terminal in response to the message requesting cooperation, in 645.

The target terminal 603 determines an optimal cooperative terminal based on the feedback information and transmits information based on the scheduling mode to the optimal cooperative terminal, in 650. For example, the optimal cooperative terminal may be one cooperative terminal or a plurality of cooperative terminals.

The target terminal 603 performs cooperative communication with the optimal cooperative terminal, in 655.

In response to the request for cooperation received from the target terminal 603 being based on a random access mode, that is, if the cooperation mode is the random access mode, in 660, the cooperative terminal 607 calculates a back-off time to provide cooperation based on transmission power of the cooperative terminal 607, in 665. In 670, the target terminal 603 performs cooperative communication with the cooperative terminal 607 based on the back-off time.

The back-off time T may be calculated by the following Equation 1.

$$T = Pu \times \text{Random}([0;CW]) \times \text{Slot time} \quad \text{[Equation 1]}$$

In Equation 1, 'Pu' represents a transmission power of a cooperative terminal in a cooperative channel between the cooperative terminal and a target terminal, CW represents a Contention Window, and Random ([0;CW]) represents a number from 0 to CW that is randomly selected by terminals. Slot time represents a reference time unit.

FIG. 7 illustrates an example of a message received by at least one neighboring terminal, based on agreement between base stations for cooperation between terminals.

Referring to FIG. 7, for example, in LTE, a base station 701 of a target terminal 703 and a base station 705 of a cooperative terminal 707 may be connected to each other via a backbone of an X2, and a negotiation or contract for cooperation between the base stations may be performed the through X2.

Message 710 that is based on the agreement is a message that is used to inform all neighboring terminals within a cell of an incentive amount with respect to the negotiation or contract for cooperation between the base station 701 of the target terminal 703 and the base station 705 of the cooperative terminal 707. The message also informs of a method of providing an incentive.

The base station 705 of the neighboring terminal 707 may broadcast the message 710 based on the agreement to all neighboring terminals 707 that are included in the cell thereof in order to identify a cooperation group in which the neighboring terminal 707 help the target terminal 703.

In the example of FIG. 7, message 710 that is based on the agreement includes an agreement request ID 712, a cell ID 714, an agreement level 716, and an incentive amount 718.

The agreement request ID 712 is an identifier to distinguish when the message based on the agreement is broadcasted by the base station 705 of the neighboring terminal 707. That is, a cooperation level or additional information used by the target terminal 703 may change over time. Accordingly, the base station 701, of the target terminal 703, may request different types of agreement or cooperation from the base station 705, of the neighboring terminal 707. Thus, the agreement request ID 712 may be used to distinguish the different types of agreement.

The cell ID 714 represents an ID of the cell in which the neighboring terminal 707 is positioned.

The agreement level 716 represents an extent of an incentive that is given based on a cooperation level that is allocated to the neighboring terminal 707. For example, if the neighboring terminal 707 provides a cooperation level corresponding to level 2 to the target terminal 703, the agreement level 716 is represented as an incentive corresponding to 50 given to the neighboring terminal 707.

The incentive amount 718 represents a method of compensation that is provided to the neighboring terminal 707 and that is based on a cooperation level and an amount of the compensation based on a compensation method.

In this example, the method of compensation provided to the neighboring terminal 707 refers to a type of compensation provided to the neighboring terminal 707 that is providing cooperation to the target terminal 703.

For example, the neighboring terminal 707 may compensate for transmission power consumed to provide cooperation by the base station 701 of the target terminal 703 reducing interference with the neighboring terminal 707 via adjustment of a beam vector. The compensation may be provided by the base station 701 of the target terminal 703 reducing interference with the neighboring terminal 707 via dynamic spectrum management (DSM). As another example, the compensation may be provided by the base station 705 of the neighboring terminal 707 increasing transmission power with respect to the neighboring terminal 707.

Figure 8:
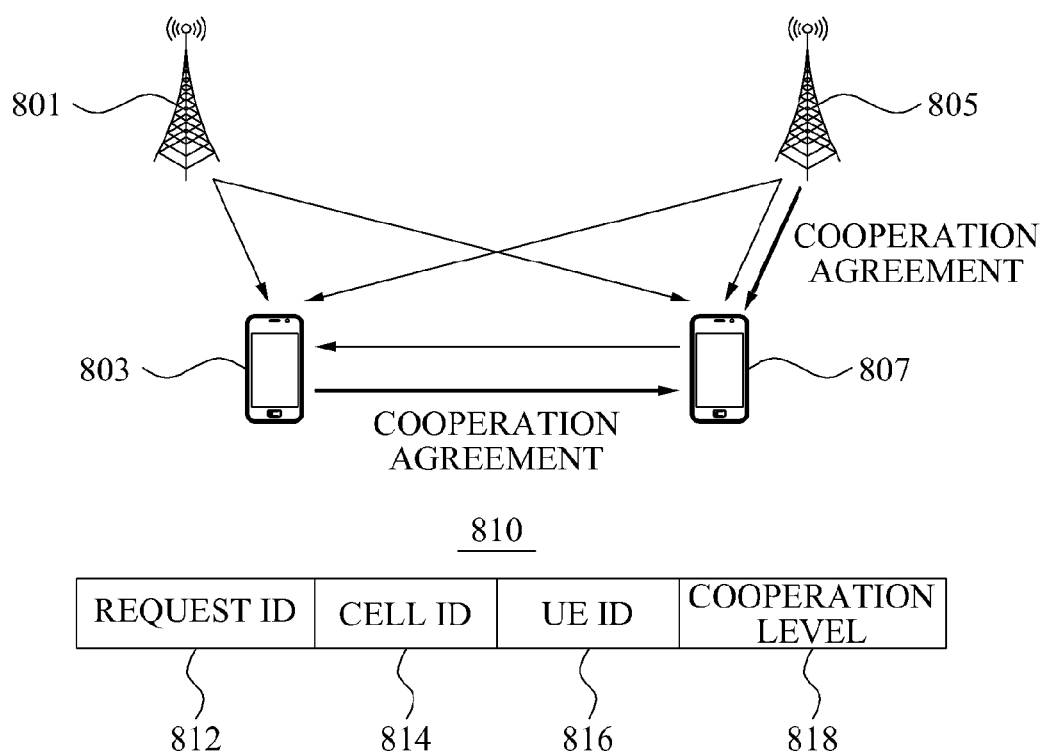
FIG. 8 is a diagram illustrating an example of a message of a target terminal requesting a neighboring terminal to join a cooperation group.

FIG. 8 illustrates an example of a message of a target terminal requesting a neighboring terminal to join a cooperation group.

Referring to FIG. 8, message 810 is a request for joining the cooperation group. The message is transmitted by a target terminal 803 to collect cooperative terminals. The message may be initiated by a base station 805 of a neighboring terminal 807 or directly by the target terminal 803 that requests cooperation.

The message 810 may include at least one of a request ID 812, a cell ID 814, a terminal ID 816, and a cooperation level 818.

The request ID 812 may be used to distinguish types of cooperation requested by the target terminal 803 over time. For example, the request ID 812 may be changed based on when cooperation is requested although received from the same target terminal 803 requesting cooperation. That is, the request ID 812 allows the neighboring terminal 807 to distinguish requests of the target terminal 803 for cooperation changing over time.

The cell ID 814 is an ID of a cell in which the target terminal 803 is positioned. The terminal ID 816 is an ID of the target terminal 803. The cooperation level 818 represents an extent of cooperation that is allocated to the neighboring terminal 807 to provide the cooperation to the target terminal 803.

Figure 9:
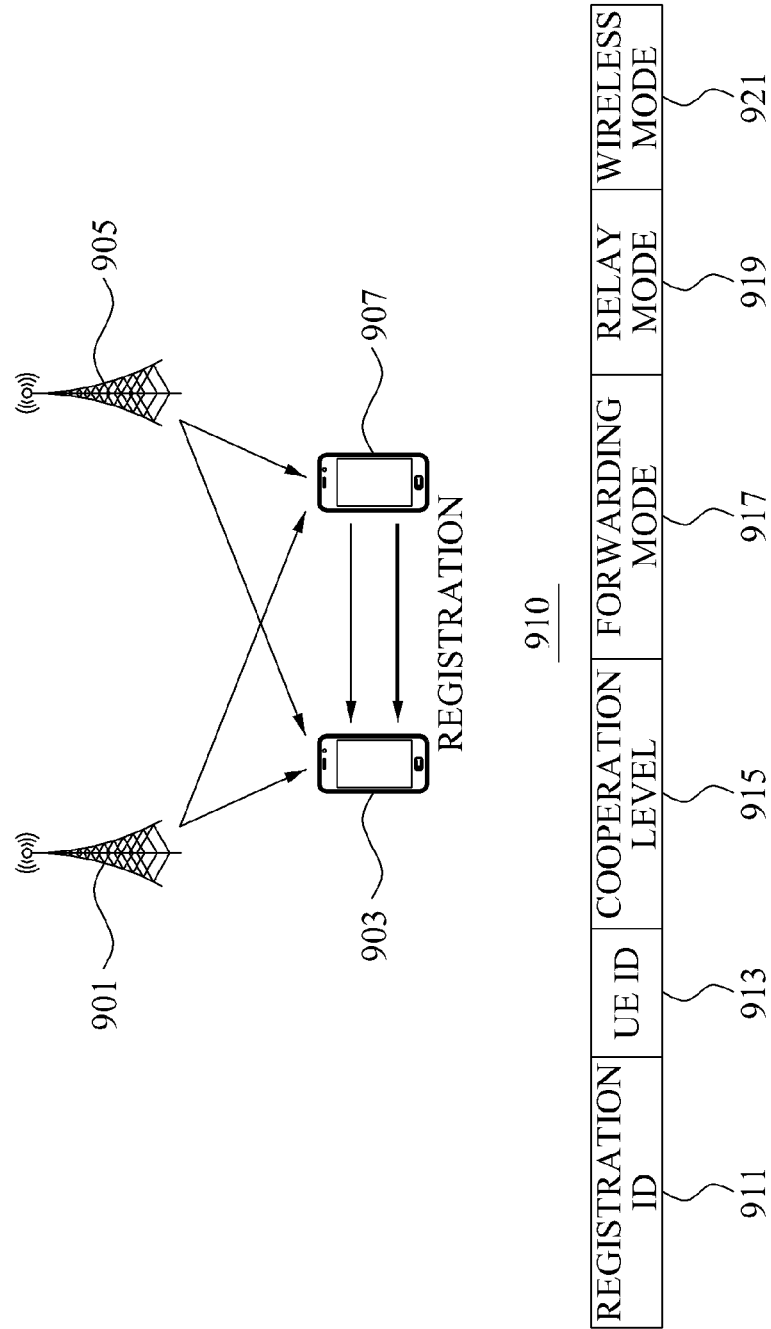
FIG. 9 is a diagram illustrating an example of a message transmitted by a neighboring terminal to a target terminal, requesting registration.

FIG. 9 illustrates an example of a message transmitted by a neighboring terminal to a target terminal, requesting registration.

Referring to FIG. 9, message 910 is a message requesting registration for cooperation, and it is provided by the neighboring terminal 907 to at least one of a target terminal 903 receiving the cooperation, a base station of the target terminal 903, a base station 905 of the neighboring terminal 907, and an external server (not shown) in order for the neighboring terminal 907 to join a cooperative group.

The information about the registration and additional information may be stored in various locations, examples of which are described with reference to FIG. 5.

The message 910 may include at least one of a registration ID 911, a target terminal ID 913, a cooperation level 915, a forwarding mode 917, a relay mode 919, and a wireless mode 921.

The registration ID 911 may be used to distinguish which cooperation the registration is for from among different types of cooperation requested by the target terminal 903 over time.

The cooperation level 915 represents a level of cooperation that is desired by the target terminal 903 to the neighboring terminal 907 and may be based on, for example, a battery capacity of the neighboring terminal 907, a processor capacity of the neighboring terminal 907, and a type of node, that is, a type of terminal.

The cooperation level 915 may be divided, for example, from a level 0 to a level 2. As an example, the level 0 may denote that the neighboring terminal 907 provides unconditional cooperation to the target terminal 903 within a predetermined range of cooperation based on a negotiation or contract. In the level 0, the neighboring terminal 907 may unconditionally provide cooperation to the target terminal 903 within the predetermined range of cooperation regardless of circumstances thereof.

As another example, a level 1 may denote that the neighboring terminal 907 provides cooperation to the target terminal 903 within a providable range of cooperation. For example, the neighboring terminal 907 may provide cooperation to the target terminal 903 if there is remaining transmission power after use by the neighboring terminal 907, or the neighboring terminal 907 may provide all transmission power for cooperation with the target terminal 903 if the neighboring terminal 907 does not perform transmission. In the level 1, the neighboring terminal 907 may provide the best effort within a range as cooperative as possible based on circumstances thereof.

As another example, level 2 may denote that the neighboring terminal 907 provides cooperation preferentially to the target terminal 903. That is, the neighboring terminal 907 unconditionally provides cooperation preferentially to the target terminal 903 regardless of circumstances thereof.

The forwarding mode 917 represents a type of information that is provided by the neighboring terminal 907 to the target terminal 903 through cooperation. For example, the forwarding mode 917 may represent whether a type of information provided by the neighboring terminal 907 to the target terminal 903 is a signal element of the target terminal 903 or an interference element of the target terminal 903.

The relay mode 919 represents a mode in which the neighboring terminal 907 provides information to the target terminal 903 through cooperation, for example, information about a mode in which the neighboring terminal 907 provides a signal element of the target terminal 903 or an interference element of the target terminal 903.

For example, if the neighboring terminal 907 uses an amplify and forward mode that amplifies and forwards a signal element to be used by the target terminal 903, the relay mode 919 may be set '0.' As another example, if the neighboring terminal 907 uses a decode and amplify mode that decodes and forwards a signal element to be used by the target terminal 903, the relay mode 919 may be set '1.' In addition, the relay mode 919 may vary based on various modes of the neighboring terminal 907 forwarding a signal element.

The wireless mode 921 represents a wireless communication method between the target terminal 903 and the neighboring terminal 907, that is, a communication method in a cooperation channel through which cooperative communication is performed. For example, mode 0 may denote WLAN, mode 1 may denote Bluetooth, and mode 2 may denote LTE.

Figure 10:
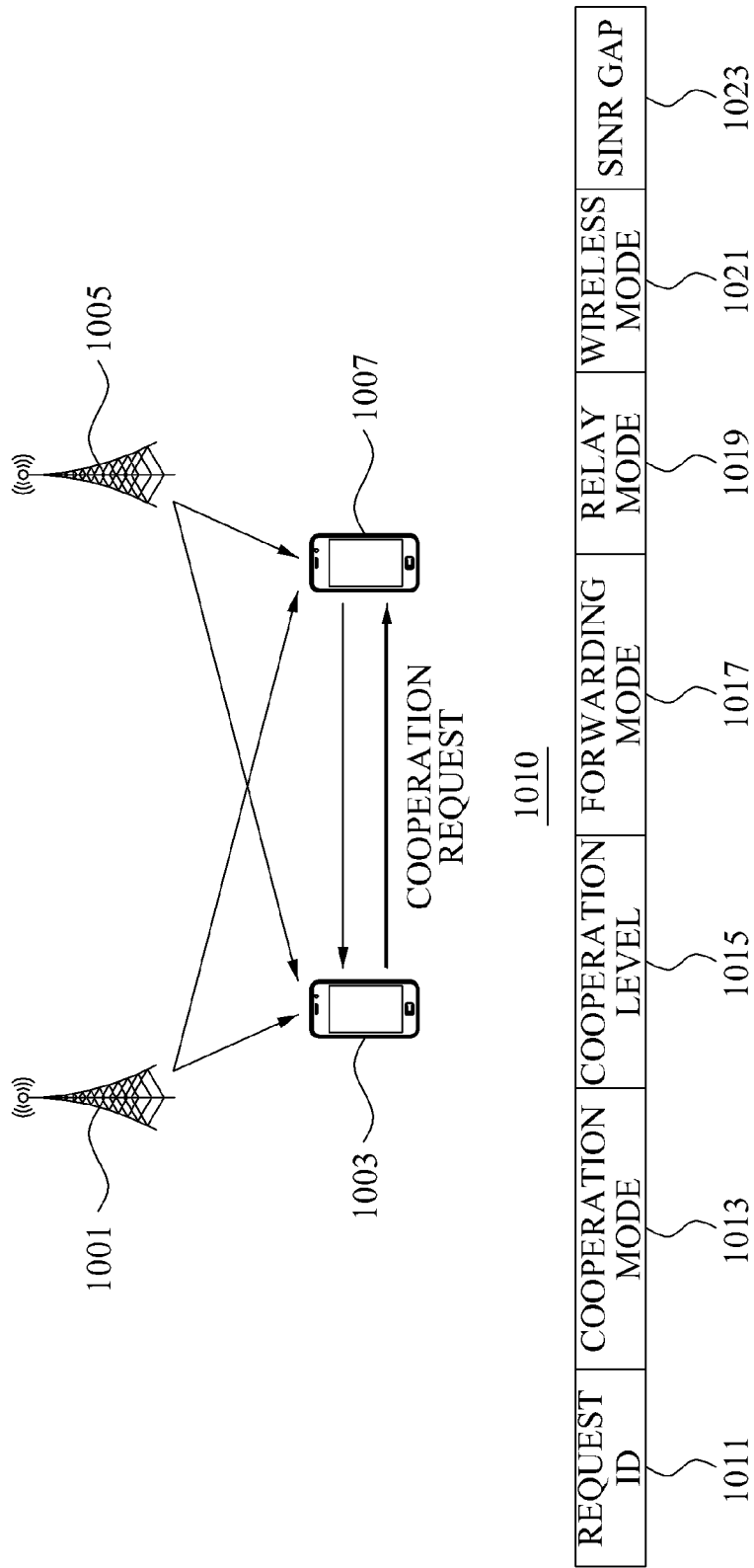
FIG. 10 is a diagram illustrating an example of a message transmitted by a target terminal to a cooperative terminal, requesting cooperation.

FIG. 10 illustrates an example of a message transmitted by a target terminal to a cooperative terminal, requesting cooperation.

Referring to FIG. 10, message 1010 requesting cooperation is a message transmitted by the target terminal 1003 to request cooperation from cooperative terminals 1007 to support a corresponding cooperation mode, a cooperation level, a forwarding mode, a relay mode, and a wireless mode.

The message 1010 requesting cooperation may include at least one of a request ID 1011, a cooperation mode 1013, a cooperation level 1015, a forwarding mode 1017, a relay mode 1019, a wireless mode 1021, and an SINR gap 1023.

The request ID 1011 may be used to distinguish types of cooperation that are requested by the target terminal 1003 over time, as described herein with reference to 911 in FIG. 9.

The cooperation mode 1013 represents a method of a neighboring terminal 1007 providing cooperation to the target terminal 1003 based on a request for cooperation. The cooperation mode 1013 may include a scheduling mode and a random access mode. The scheduling mode is also referred to as a central cooperation control mode, in which the target terminal 1003 determines an optimal cooperative terminal based on feedback information that is received from the neighboring terminal 1007. In this example, the target terminal 1003 performs cooperative communication with the optimal cooperative terminal.

The random access mode is also referred to as a distributed cooperation control mode, in which neighboring terminals 1007 are distributed and randomly provide cooperation to the target terminal 1003.

Examples of the scheduling mode and the random access mode are described with reference to FIGS. 11 and 12.

The cooperation level 1015, the forwarding mode 1017, the relay mode 1019, and the wireless mode 1021 of the message 1010 requesting cooperation are the same as the cooperation level 915, the forwarding mode 917, the relay mode 919, and the wireless mode 921 of the message 910 of the request for registration in FIG. 9.

The SINR gap 1023 represents a gap between an SINR of the target terminal 1003 and a preset target SINR or a desired SINR.

Figure 11:
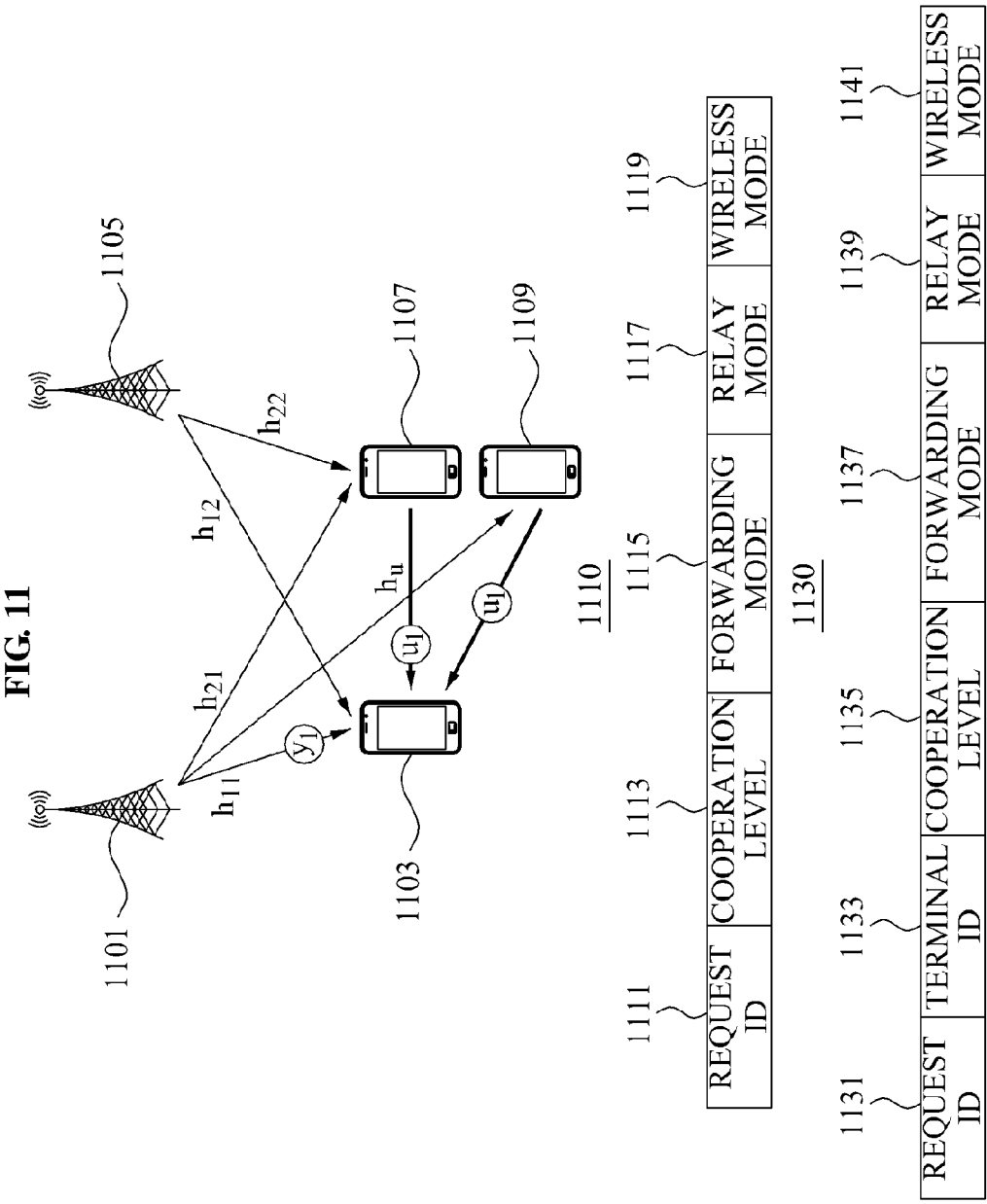
FIG. 11 is a diagram illustrating an example of a scheduling mode.

FIG. 11 illustrates an example of a scheduling mode.

Referring to FIG. 11, the scheduling mode is a cooperation mode in which a target terminal 1103 receives feedback information $u_1$ from cooperative terminals 1107 and 1109 through a cooperation channel $h_{u_i}$. The target terminal 1103 may determine an optimal cooperative terminal based on the received feedback information, and may perform cooperative communication with the optimal cooperative terminal. The scheduling mode is also referred to as a central cooperation control mode because the target terminal 1103 selects an optimal cooperative terminal to perform cooperative communication with.

In response to a predetermined event based on agreement between base stations occurring, for example, if an SINR of the target terminal 1103 is lower than a preset value, the target terminal 1103 determines a cooperation mode and performs cooperative communication with at least one of the cooperative terminals 1107 and 1109 that are included in a cooperation group based on the cooperation mode.

In this example, if the cooperation mode determined by the target terminal 1103 is a scheduling mode, at least one cooperative terminal 1107 or 1109 included in the cooperation group receives a request for cooperation based on the scheduling mode from the target terminal 1103. The at least one cooperative terminal 1107 or 1109 transmits a message including feedback information to the target terminal 1103.

For example, message 1110 including the feedback information transmitted by the at least one cooperative terminal 1107 or 1109 to the target terminal 1103 may include at least one of a request ID 1111, a cooperation level 1113, a forwarding mode 1115, a relay mode 1117, and a wireless mode 1119.

For example, the message 1110 including the feedback information may provide information about cooperation provided by the at least one cooperative terminal 1107 or 1109 to the target terminal 1103 through cooperation. As an example, the cooperation information may be information that the target terminal 1103 provides a signal element of the target terminal 1103 (forwarding mode 1115) in a level 1 (cooperation level 1113) through Bluetooth (wireless mode 1119) using a decode and forward mode (relay mode 1117) with respect to cooperation requested at 1 hours 20 minutes 55 seconds (registration ID 1111).

The respective elements of the message 1110 including the feedback information are the same as those of the message 1010 of the request for cooperation of FIG. 10, and thus descriptions thereof are omitted for clarity and conciseness.

The target terminal 1103 determines an optimal cooperative terminal from among the cooperative terminals 1107 or 1109, based on the message 1110 including the feedback information and transmits a message 1130 including scheduling information with respect to the optimal cooperative terminal to the terminal.

The message 1130 including the scheduling information may include at least one of a request ID 1131, a terminal ID 1133, a cooperation level 1135, a forwarding mode 1137, a relay mode 1139, and a wireless mode 1141.

The request ID may be used to distinguish types of cooperation requested by the target terminal 1103 over time.

The terminal ID 1133 is an ID of the optimal cooperative terminal.

The cooperation level 1135 represents an extent of cooperation requested from a cooperative terminal, for example, the optimal cooperative terminal, in order to provide cooperation to the target terminal 1103.

The forwarding mode 1137 represents a type of information that is provided by the optimal cooperative terminal to the target terminal 1103 through cooperation.

The relay mode 1139 represents a mode in which the optimal cooperative terminal provides information through cooperation, to the target terminal 1103.

The wireless mode 1141 represents a wireless communication method between the target terminal 1103 and the optimal cooperative terminal.

In this example, the message 1130 including the scheduling information is similar to the message 1110 including the feedback information but further includes the ID of the optimal cooperative terminal.

Figure 12:
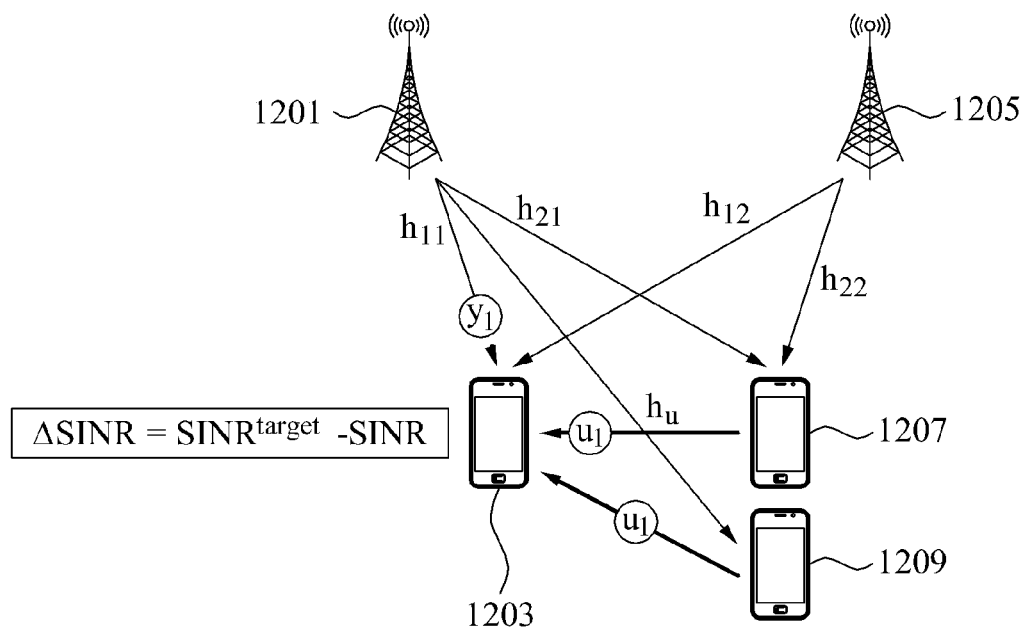
FIG. 12 is a diagram illustrating an example of a random access mode.

FIG. 12 illustrates an example of a random access mode.

Referring to FIG. 12, in the random access mode, if a predetermined event based on agreement between base stations such as between a base station 1201 of a target terminal 1203 and a base station 1205 of a cooperative terminal 1, 1207 and a cooperative terminal 2, 1209, occurs, the target terminal 1203 determines a cooperation mode and performs cooperative communication with the cooperative terminal 1, 1207 and the cooperative terminal 2, 1209 that are included in a cooperation group based on the cooperation mode.

For example, the predetermined event based on the agreement between the base stations include a case in which an SINR of a signal $y_1$ received by the target terminal 1203 through a channel $h_{11}$ between the target terminal 1203 and the base station 1201 of the target terminal 1203 is lower than a preset SINR ($SINR^{target}$).

The target terminal 1203 may transmit a message 1010 requesting cooperation to the cooperative terminal 1, 1207 and the cooperative terminal 2, 1209 based on the cooperation mode. In this example, the message 1010 requesting cooperation may include an SINR gap ($\Delta SINR$) 1023 between an SINR of the signal $y_1$ of the target terminal and the preset SINR ($SINR^{target}$).

If the request for cooperation received from the target terminal 1203 is a random access mode, the cooperative terminal 1, 1207 and the cooperative terminal 2, 1209 calculate a back-off time to provide cooperation based on transmission power of each of the cooperative terminal 1, 1207 and the cooperative terminal 2, 1209.

For example, at least one cooperative terminal 1207 or 1209 may determine whether the request for cooperation received from the target terminal 1203 is based on a random access mode or a scheduling mode through the cooperation mode 1013 of the message 1010 of the request for cooperation.

In the random access mode, the cooperative terminal 1, 1207 and the cooperative terminal 2, 1209 may randomly provide cooperation to the target terminal 1203. The cooperative terminal 1, 1207 and the cooperative terminal 2, 1209 may provide cooperation to the target terminal 1203 based on the back-off time calculated using Equation 1.

For example, assuming that the cooperative terminal 1, 1207 has a Random ([0;CW]) of 0.5, the cooperative terminal 2, 1209 has a Random ([0;CW]) of 0.7, the cooperative terminal 1, 1207 has a transmission power 10, and the cooperative terminal 2 1209 has a transmission power of 5, a time slot is 1. In this example, using Equation 1, the cooperative terminal 1, 1207 has a back-off time of 5 seconds that is obtained by 0.5×10×1, and the cooperative terminal 2, 1209 has a back-off time of 3.5 seconds that is obtained by 0.7×5×1.

Thus, the cooperative terminal 2, 1209 may provide cooperation to the target terminal 1203 through cooperative communication after 3.5 seconds, and the cooperative terminal 1 1207 may provide cooperation after 5 seconds.

If an event in which the target terminal 1203 uses cooperation through cooperative communication between the target terminal 1203 and the cooperative terminal 2 1209 is resolved, that is, if the cooperative terminal 2 1209 provides transmission power corresponding to an SINR gap 1023, the target terminal 1203 may transmit a message requesting termination of the cooperation to the remaining cooperative terminal 1, 1207 in order to stop cooperative communication.

According to various examples herein, a cooperative terminal that has a better SINR or a better channel condition provides a signal element or an interference element to a target terminal that receives help through cooperation between terminals based on a random access mode or a scheduling mode, so that an SINR of the target terminal is improved without help of a base station.

Figure 13:
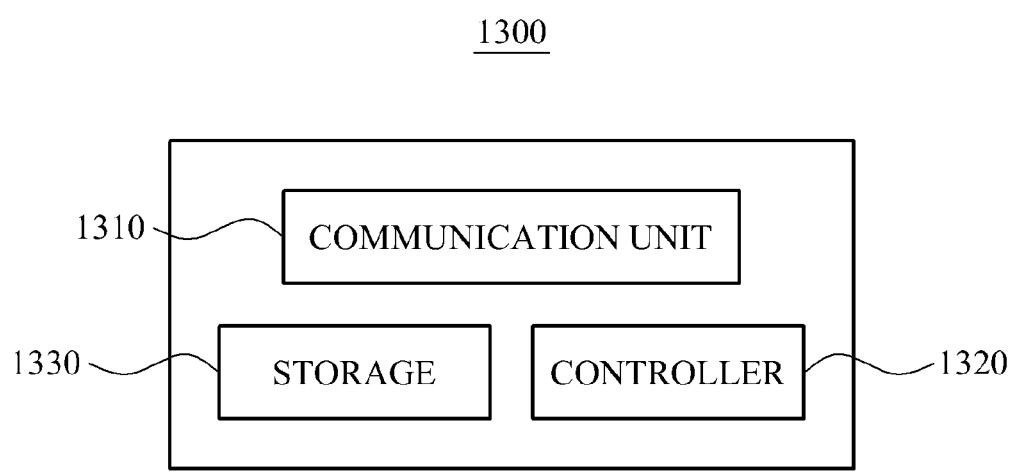
FIG. 13 is a diagram illustrating an example of a target terminal and a cooperative terminal.

FIG. 13 illustrates an example of a target terminal. The same terminal may perform the functions of a target terminal and a cooperative terminal, however, for ease of description a separate terminal is used to describe the target terminal and the cooperative terminal.

Referring to FIG. 13, target terminal 1300 includes a communication unit 1310 and a controller 1320.

The target terminal may receive cooperative communication from a cooperation group that includes one or more cooperative terminals. The communication unit 1310 may communicate with neighboring terminals. For example, the communication unit 1310 may include a transmitter and a receiver. The transmitter may transmit requests for joining the cooperation group to neighboring terminals. The receiver may receive registration request messages from neighboring terminals. The transmitter may transmit a request for cooperative communication to one or more cooperative terminals included in the cooperation group. The receiver may receive the cooperative communications from the one or more cooperative terminals that are used for cooperative communication. Accordingly, a signal received by the receiver may be enhanced with the data received from the cooperative terminals.

The controller 1320 may form the cooperation group based on registration requests received from the neighboring terminals. The controller 1320 may determine a cooperation mode from among a plurality of cooperation modes, in response to a predetermined event occurring that triggers cooperative communication. In response to the predetermined event occurring, the transmitter may transmit a request for cooperative communication indicating the determined cooperation mode to at least one cooperative terminal included in the cooperation group.

The plurality of cooperation modes may include a scheduling mode in which the target terminal determines an optimal cooperative terminal from among the cooperation group based on feedback information that is received from the cooperative terminals included in the cooperation group, and a random access mode in which the cooperative terminals included in the cooperation group randomly perform cooperation with the target terminal.

The target terminal 1300 may further comprising a storage unit 1330 to store cooperative communication information such as a location of the target terminal and a location of cooperative terminals included in the cooperation group, and conditions for cooperative communication of the target terminal and the cooperative terminals included in the cooperation group.

The examples described herein with respect to FIGS. 1-12 are applicable to the target terminal 1300 described with reference to FIG. 13.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a neighboring terminal, the method comprising:
   determining whether to cooperate with at least one target terminal;
   receiving a request for joining a cooperation group from the at least one target terminal;
   requesting registration from the at least one target terminal to join the cooperation group; and
   performing cooperative communication with the at least one target terminal based on registration information that is obtained when the neighboring terminal joins the cooperation group.

2. The communication method of claim 1, wherein the determining whether to cooperate comprises:
   receiving a message based on an agreement between base stations for cooperation between terminals, which is broadcasted from a base station of the at least one neighboring terminal; and
   determining whether to cooperate with the at least one target terminal based on the message based on the agreement.

3. The communication method of claim 2, wherein the message based on the agreement comprises at least one of an agreement request identification (ID) that is used to identify when the agreement is broadcasted by the base station of the neighboring terminal, an ID of a cell in which the neighboring terminal is positioned, an agreement level that represents an extent of an incentive given based on a cooperation level requested allocated to the neighboring terminal, and an incentive amount that represents a compensation method provided to the neighboring terminal based on the cooperation level and a compensation amount based on the compensation method.

4. The communication method of claim 3, wherein the compensation method provided to the neighboring terminal comprises at least one of a method of reducing interference with the neighboring terminal via adjustment of a beam vector, a method of reducing interference with the neighboring terminal via dynamic spectrum management (DSM), and a method of increasing transmission power with respect to the neighboring terminal.

5. The communication method of claim 1, wherein the request for joining the cooperation group comprises at least one of a request ID to distinguish types of cooperation requested by the at least one target terminal over time, an ID of a cell in which the at least one target terminal is positioned, an ID of the at least one target terminal, and a cooperation level allocated to the neighboring terminal to provide cooperation to the at least one target terminal.

6. The communication method of claim 1, wherein the requesting the registration from the at least one target terminal further comprises transmitting a registration request message for cooperation provided by the neighboring terminal to at least one of the at least one target terminal, a base station of the at least one target terminal, a base station of the neighboring terminal, and an external server, and
   wherein the registration request message comprises at least one of a registration ID to distinguish which cooperation the registration is for among types of cooperation requested by the at least one target terminal over time, an ID of the at least one target terminal, a cooperation level allocated to the neighboring terminal, a forwarding mode that represents a type of information provided to the at least one target terminal through the cooperation, a relay mode that represents a mode in which the information is provided to the at least one target terminal, and a wireless mode that represents a wireless communication method between the at least one target terminal and the neighboring terminal.

7. The communication method of claim 6, wherein the cooperation level is classified based on at least one of a battery capacity of the neighboring terminal and a processor capacity of the neighboring terminal.

8. The communication method of claim 6, wherein the cooperation level comprises at least one of a level 0 to provide unconditional cooperation to the at least one target terminal within a predetermined range of cooperation, a level 1 to provide cooperation to the at least one target terminal within a providable range of cooperation provided by the neighboring terminal, and a level 2 to provide cooperation preferentially to the at least one target terminal.

9. The communication method of claim 1, wherein the performing the cooperative communication with the at least one target terminal based on the registration information comprises:
   receiving a request for the cooperation from the at least one target terminal; and
   performing cooperative communication with the at least one target terminal based on the registration information according to the request for the cooperation.

10. The communication method of claim 9, wherein the request for cooperation comprises at least one of a registration ID to distinguish types of cooperation requested by the at least one target terminal over time, a cooperation mode that represents a method of providing cooperation to the at least one target terminal based on the request for the cooperation, a cooperation level allocated to the neighboring terminal to provide cooperation to the at least one target terminal, a forwarding mode that represents a type of information provided to the at least one target terminal through the cooperation, a relay mode that represents a mode in which the information is provided to the at least one target terminal, a wireless mode that represents a wireless communication method between the at least one target terminal and the neighboring terminal, and a signal to interference plus noise ratio (SINR) gap between an SINR of the at least one target terminal and a preset target SINR.

11. The communication method of claim 10, wherein the cooperation mode is one of a scheduling mode in which the at least one target terminal determines an optimal cooperative terminal based on feedback information that is received from the neighboring terminal, and a random access mode in which the neighboring terminal randomly provides cooperation to the at least one target terminal.

12. The communication method of claim 11, wherein the performing the cooperative communication with the at least one target terminal comprises calculating a back-off time to provide the cooperation based on transmission power of the neighboring terminal, in response to a request for cooperation received from the at least one target terminal being based on a random access mode.

13. The communication method of claim 11, wherein the performing the cooperative communication with the at least one target terminal comprises:
   transmitting a message including feedback information to the at least one target terminal; and
   receiving a message including scheduling information about an optimal cooperative terminal that is determined by the at least one target terminal based on the message including the feedback information,
in response to a request for cooperation received from the at least one target terminal being based on a scheduling mode.

14. The communication method of claim 13, wherein the message including the feedback information comprises at least one of a registration ID to distinguish types of cooperation requested by the at least one target terminal over time, a cooperation level allocated to the neighboring terminal to provide cooperation to the at least one target terminal, a forwarding mode that represents a type of information provided to the at least one target terminal through the cooperation, a relay mode that represents a mode in which the information is provided to the at least one target terminal, and a wireless mode that represents a wireless communication method between the at least one target terminal and the neighboring terminal, and
wherein the message including the scheduling information further comprises an ID of the optimal cooperative terminal in addition to the message including the feedback information.

15. A communication method of a target terminal, the method comprising:
requesting a neighboring terminal to join a cooperation group;
receiving a registration request from the at least one neighboring terminal, in response to the request to join;
allowing the at least one neighboring terminal to join the cooperation group based on the registration request; and
performing cooperative communication with the at least one cooperative terminal included in the cooperation group, in response to a predetermined event based on agreement between base stations occurring.

16. The communication method of claim 15, wherein the requesting the neighboring terminal to join the cooperation group comprises transmitting a message, and
the message comprises at least one of a request ID to distinguish types of cooperation requested by the target terminal over time, an identification (ID) of a cell in which the target terminal is positioned, an ID of the target terminal, and a cooperation level allocated to the at least one neighboring terminal to provide cooperation to the target terminal.

17. The communication method of claim 15, wherein the receiving the registration request from the at least one neighboring terminal comprises receiving a message comprising at least one of a registration ID to distinguish which cooperation the registration is for among types of cooperation requested by the at least one target terminal over time, an ID of the target terminal, a cooperation level allocated to the at least one neighboring terminal, a forwarding mode that represents a type of information provided to the target terminal through the cooperation, a relay mode that represents a mode in which the information is provided to the target terminal, and a wireless mode that represents a wireless communication method between the target terminal and the at least one neighboring terminal.

18. The communication method of claim 15, wherein the performing the cooperative communication comprises:
determining a cooperation mode between the target terminal and the at least one cooperative terminal; and
transmitting a request for cooperation to the at least one cooperative terminal included in the cooperation group based on the cooperation mode, and
wherein the request for cooperation comprises at least one of a registration ID to distinguish types of cooperation requested by the target terminal over time, a cooperation mode that represents a method of providing cooperation to the target terminal based on the request for cooperation, a cooperation level allocated to the at least one cooperative terminal to provide cooperation to the target terminal, a forwarding mode that represents a type of information provided to the target terminal through the cooperation, a relay mode that represents a mode in which the information is provided to the target terminal, a wireless mode that represents a wireless communication method between the target terminal and the at least one cooperative terminal, and a signal to interference plus noise ratio (SINR) gap between an SINR of the target terminal and a preset target SINR.

19. The communication method of claim 15, wherein the cooperation mode is one of a scheduling mode in which the target terminal determines an optimal cooperative terminal based on feedback information that is received from the at least one cooperative terminal, or a random access mode in which the at least one cooperative terminal randomly provides cooperation to the target terminal.

20. The communication method of claim 19, further comprising:
determining an optimal cooperative terminal based on feedback information that is received from the at least one cooperative terminal included in the cooperation group when the cooperation mode is the scheduling mode; and
transmitting information based on the scheduling mode to the optimal cooperative terminal,
wherein the transmitting the information based on the scheduling mode comprises transmitting a message including scheduling information, the message comprising at least one of a registration ID to distinguish types of cooperation requested by the target terminal over time, a cooperation level allocated to the at least one cooperative terminal to provide cooperation to the target terminal, a forwarding mode that represents a type of information provided to the target terminal through the cooperation, a relay mode that represents a mode in which the information is provided to the target terminal, and a wireless mode that represents a wireless communication method between the target terminal and the at least one cooperative terminal.

21. A non-transitory computer-readable storage medium comprising program instructions to cause a processor to implement a method comprising:
determining whether to cooperate with at least one target terminal;
receiving a request for joining a cooperation group from the at least one target terminal;
requesting registration from the at least one target terminal to join the cooperation group; and
performing cooperative communication with the at least one target terminal based on registration information that is obtained when the neighboring terminal joins the cooperation group.

22. A target terminal for receiving cooperative communication from a cooperation group, the target terminal comprising:
a communication unit configured to communicate with neighboring terminals; and
a controller configured to form the cooperation group based on registration requests received from the neighboring terminals, and in response to a predetermined event occurring that triggers cooperative communication, configured to determine a cooperation mode from among a plurality of cooperation modes, wherein, in response to the predetermined event occurring, the transmitter transmits a request for cooperative communication indicating the determined cooperation mode to at least one cooperative terminal included in the cooperation group.

23. The target terminal of claim 22, wherein the plurality of cooperation modes comprise:
   a scheduling mode in which the target terminal determines an optimal cooperative terminal from among the cooperative terminals included in the cooperation group, based on feedback information that is received from the cooperative terminals included in the cooperation group; and
   a random access mode in which the cooperative terminals included in the cooperation group randomly perform cooperative communication with the target terminal.

24. The target terminal of claim 22, further comprising a storage unit configured to store a location of the target terminal and a location of cooperative terminals included in the cooperation group, and conditions for cooperative communication of the target terminal and the cooperative terminals included in the cooperation group.

25. The target terminal of claim 22, wherein the receiver is further configured to receive cooperative communication from at least one cooperative terminal, the cooperative communication comprising at least one of a signal destined for the target terminal and a signal that acts as interference on the target terminal.

26. The target terminal of claim 22, wherein the event that triggers the cooperative communication is the quality of a received signal dropping below a predetermined threshold.

* * * * *